(12) United States Patent
Gunsberg

(10) Patent No.: US 12,524,642 B2
(45) Date of Patent: Jan. 13, 2026

(54) HIGH TEMPERATURE RFID TAG

(71) Applicant: Gabriel Gunsberg, Brookline, MA (US)

(72) Inventor: Gabriel Gunsberg, Brookline, MA (US)

(73) Assignee: Gabriel Gunsberg, Brookline, MA (US)

( * ) Notice: Subject to any disclaimer, the term of this patent is extended or adjusted under 35 U.S.C. 154(b) by 0 days.

(21) Appl. No.: 18/605,962

(22) Filed: Mar. 15, 2024

(65) Prior Publication Data

US 2024/0311608 A1    Sep. 19, 2024

Related U.S. Application Data

(60) Provisional application No. 63/452,299, filed on Mar. 15, 2023.

(51) Int. Cl.
*G06K 19/077* (2006.01)
*G06K 19/07* (2006.01)

(52) U.S. Cl.
CPC ..... *G06K 19/0773* (2013.01); *G06K 19/0723* (2013.01)

(58) Field of Classification Search
CPC ............. G06K 19/0773; G06K 19/0723
USPC ........................................... 235/492
See application file for complete search history.

(56) References Cited

U.S. PATENT DOCUMENTS

| | | | |
|---|---|---|---|
| 6,451,154 B1* | 9/2002 | Grabau | G06K 17/0025 257/679 |
| 2008/0198022 A1* | 8/2008 | Battles | G09F 3/10 340/572.8 |
| 2011/0017832 A1* | 1/2011 | Ritamaki | G06K 19/0775 235/492 |
| 2015/0154489 A1* | 6/2015 | Dancausse | G06K 19/07722 235/492 |
| 2015/0278671 A1* | 10/2015 | Martin | G06K 19/027 29/601 |
| 2016/0048751 A1* | 2/2016 | Imbruglio | G06K 19/07754 235/492 |
| 2017/0337852 A1* | 11/2017 | Oster | G09F 3/10 |
| 2023/0004771 A1* | 1/2023 | Kuechenthal | G06K 19/0723 |
| 2023/0376716 A1* | 11/2023 | Schroer | G06K 19/0776 |

* cited by examiner

*Primary Examiner* — Ahshik Kim
(74) *Attorney, Agent, or Firm* — Bodman PLC

(57) ABSTRACT

A high temperature radio frequency identification (RFID) tag component is disclosed that includes a base member made from a polyimide material and an attached radio frequency identification element. The high temperature radio frequency tag component is adapted for attachment to goods, inventory items, and/or assets that are at an elevated temperature, or to an inventory item or asset that is within an environment at an elevated temperature above 400° F.

11 Claims, 4 Drawing Sheets

HIGH TEMPERATURE RFID TAG

CROSS-REFERENCE TO RELATED APPLICATIONS

The subject patent application claims priority to, and all the benefits of, U.S. Provisional Patent Application No. 63/452,299, filed on Mar. 15, 2023, the entire contents of which are incorporated by reference herein.

BACKGROUND

It is known to use tags that attach to goods, inventory items, and assets, collectively referred to as items, for identification purposes. It is also known to use Radio Frequency Identification (RFID) tags in association with goods to electronically identify and track items.

When it comes to tagging items in high temperature environments and when the items themselves are at elevated temperatures there are several known types of tags that are used. Rigid plastic and ceramic tags, that are not printable using standard label printers, are known to be used in combination with RFID elements up to temperatures of approximately 400° F.

However, for temperature ranges 400° F. and above, it is known to use metal tags to identify the items. Some disadvantages of this option include the high cost of the metal tags, as well as the high cost and specialized nature of the printers that are required to print on the metal tags. Further, RFID tags are not used in association with inventory items or in environments where the temperature is greater than approximately 400° F.

Therefore, there is a need for a non-metal tag that is flexible, easily printable, and that can electronically identify and track inventory items with the use of an RFID element while withstanding high temperatures greater than approximately 400° F.

SUMMARY

The invention of the present application provides for affixing RFID tags to still-hot products, enabling real time tracking of the products from nearly the moment of release from a furnace or other manufacturing process that heats the products even up to 900° F. Therefore, manufactured products may now be tracked within a manufacturing facility even while hot. Further, the RFID tags of the present invention may stay with the manufactured products providing real time tracking even when the products have cooled, and even when they have been removed from the manufacturing facility.

According to one aspect of the invention, a high temperature radio frequency identification (RFID) tag component is disclosed. The RFID tag component includes a base member made from a polyimide material, and a radio frequency identification element attached to the base member.

In another aspect, a high temperature radio frequency identification tag component is disclosed. The high temperature radio frequency identification tag component includes a first base member extending between a first edge and a second edge, and a first radio frequency identification element attached to the first base member. The high temperature radio frequency identification tag component further includes a second base member extending between a first edge and a second edge and, a second radio frequency identification element attached to the second base member. The first edge of the second base member is coupled to the second edge of the first base member, and the first edge of the second base member and the second edge of the first base member are defined by perforations for separating the first base member from the second base member.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
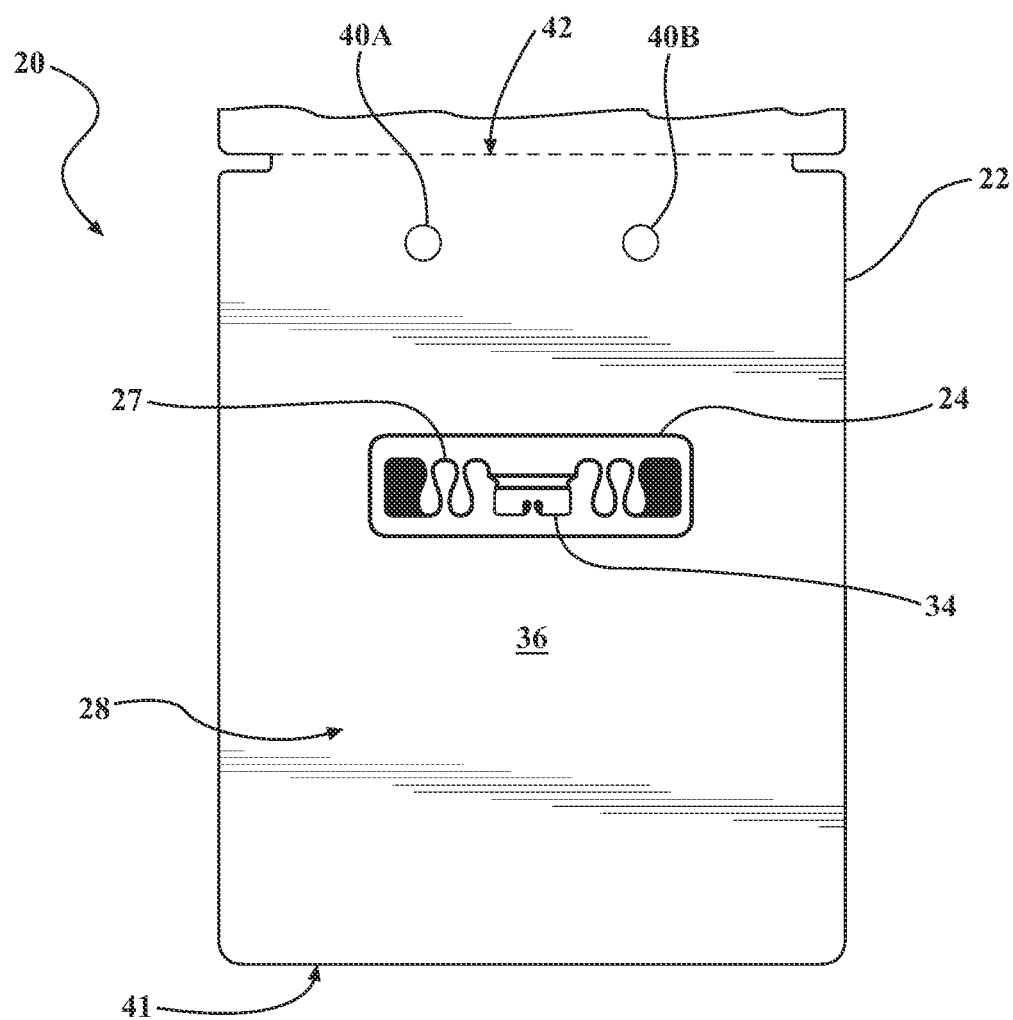
FIG. 1 is a rear view of a first embodiment of a high temperature radio frequency identification tag component.
Figure 2:
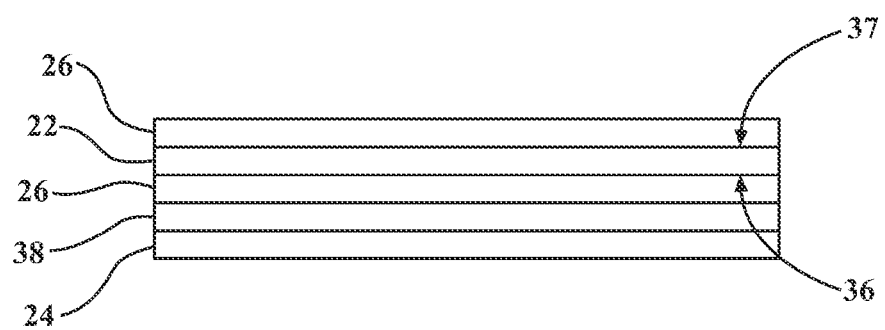
FIG. 2 is a schematic cross-section view of the radio frequency identification tag component of FIG. 1.
Figure 3:
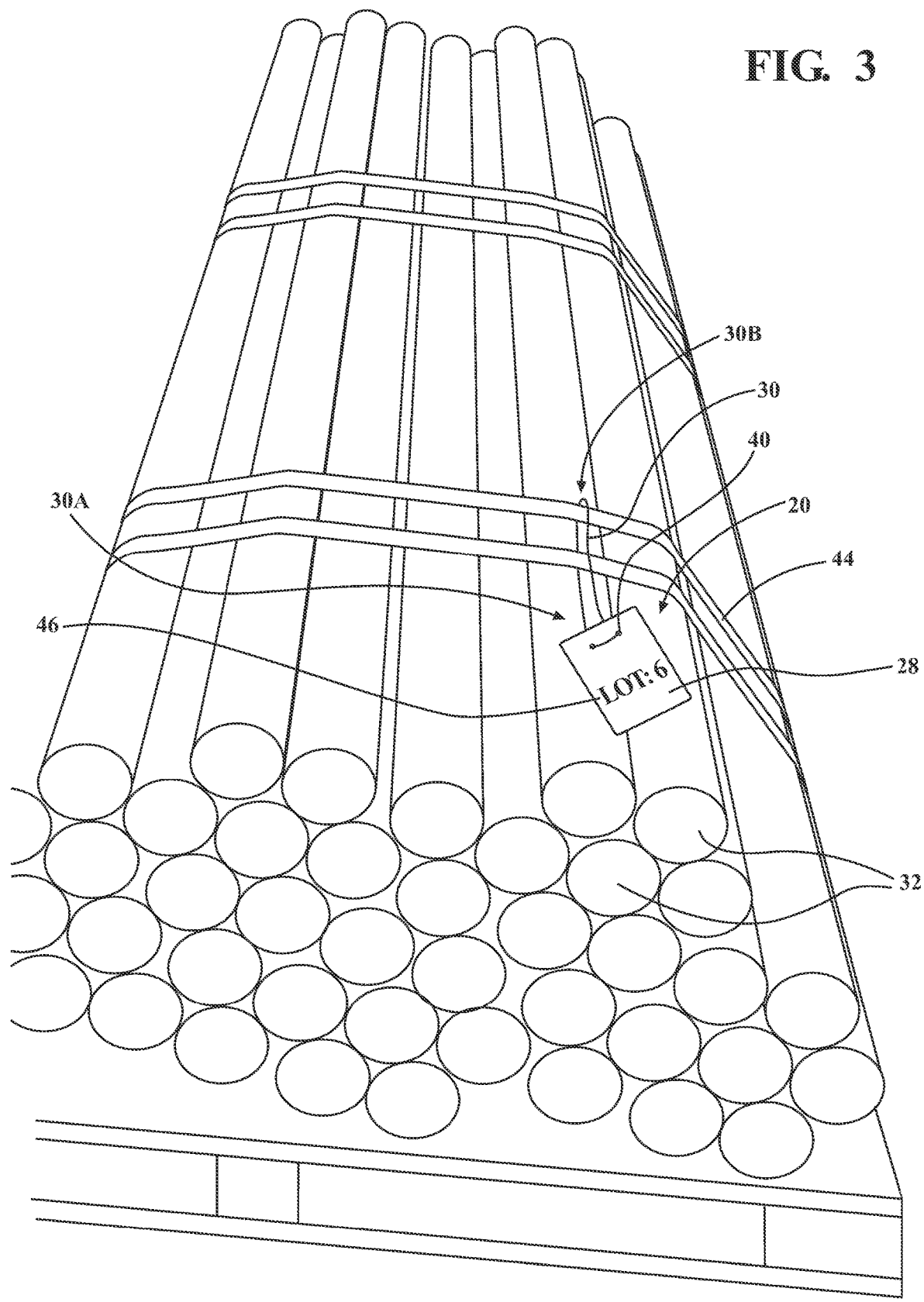
FIG. 3 is a perspective view of the high temperature radio frequency identification tag component illustrated in FIG. 1 attached to an inventory item.

Referring to the Figures, wherein like numerals indicate like or corresponding parts throughout the several views, a high temperature RFID tag component is shown generally at 20. Referring to FIGS. 1 and 2, the high temperature RFID tag component 20 includes a base member 22 made from a polyimide material and an attached Radio Frequency Identification (RFID) element 24. The polyimide base member 22 is optionally coated with a printable coating 26. The polyimide material is a class of heat resistant polymers that include aliphatic, semi-aromatic, and aromatic variants. In one embodiment the polyimide material is a thermoplastic and in an alternative embodiment the polyimide material is thermosetting. It should be understood to those of skill in the art that polymers providing similar thermal and performance properties are also within the scope of this invention. The polyimide base member 22, attached RFID element 24, and optional printable coating 26 together are referred to as the identification (ID) tag 28. Referring to FIG. 3, the high temperature RFID tag component 20 may further include an attachment component 30, for example a metal wire. The attachment component 30 is adapted for attachment to an inventory item 32 that may be at an elevated temperature, for example a bundle of newly formed steel bars or rolls.

The base member 22 is made from a polyimide material that is flexible, can be cut to a desired shape and size, and able to withstand high temperatures, up to approximately 1100° F. In one embodiment, illustrated in FIG. 1, the base member 22 has a generally rectangular shape extending from a first edge 41 to a second edge 42. The base member 22 may measure approximately six inches long between the first edge 41 and the second edge 42, approximately 4.5 inches wide, and approximately 0.005 inches thick, having an area of approximately 27 inches square. Similarly, in one embodiment the RFID element 24 has a rectangular shape measuring approximately 2.5 inches wide and approximately 0.5 inches tall, with an area of approximately 1.25 inches square. In the embodiment shown here, the ratio of the area of the base member 22 to the area of the RFID element 24 is greater than 20:1. Ratios of the area of the base member 22 to the area of the RFID element 24 greater than 10:1 are further contemplated. The shape, dimensions, and orientation of this embodiment are not limiting. Therefore, it is within the scope of this invention for the base member to include other shapes, dimensions, and orientations.

In the embodiment illustrated herein, the RFID element 24 attached to the polyimide base member 22 may be a passive RFID element, which communicates via radio waves with a RFID reader (not illustrated in the Figures) that is separate and remote from the RFID tag component 20. The RFID element 24 may further includes an antenna 27 embedded in the passive RFID tag component 20, which receives a RF (radio frequency) signal from the RFID reader. When the antenna 27 receives the signal from the RFID reader, energy from the signal activates a circuit 34 within the RFID element 24, prompting a coded message to be transmitted from the RFID element 24 back to the RFID reader. The outgoing coded message includes specific information that can be read by the RFID reader. For example, the specific information may include a unique identifier, such as a serial number, or other data related to the inventory item 32 the RFID tag component 20 is attached to, such as a manufacturing date, a part number, an item quantity, or a batch number.

In one embodiment, illustrated in FIG. 1, the polyimide base member 22 includes a single piece of polyimide material having a first surface 36 and a second surface 37. The RFID element 24 may be attached to the first surface 36 of the single piece of polyimide. The RFID element 24 may be attached using an adhesive 38. Alternatively, the RFID element 24 may be attached to the first surface 36 by other processes such as a fastener or an ultrasonic welding process. Optionally, the polyimide single piece may be coated on either the first surface 36 or the second surface 37 with a printable coating 26 prior to adhesion of the RFID element 24 onto the first surface 36 of the polyimide base member 22. The RFID element 24 may be attached to the first surface 36 of the polyimide material, which may be coated with a printable coating 26 by the adhesive 38. The adhesive 38 may be a high temperature adhesive that is resistant to breakdown and loss of adhesion. In FIG. 1, both the first surface 36 and the second surface 37 of the polyimide base member 22 are coated with the printable coating 26. One of ordinary skill in the art will appreciate that the RFID element 24 could be adhered to the printable coating 26, or directly to the polyimide base member 22 as is desired by a given process. The printable coating 26 is an intermediate substrate that facilitates printing identifying markings on the RFID tag component 20 using a printing device (not shown). Due to the low surface energy of the polyimide construction, printing identifying markings or information directly on the base member 22 is difficult, and the addition of the printable coating 26 creates a surface that various printing processes can effectively mark.

Figure 4:
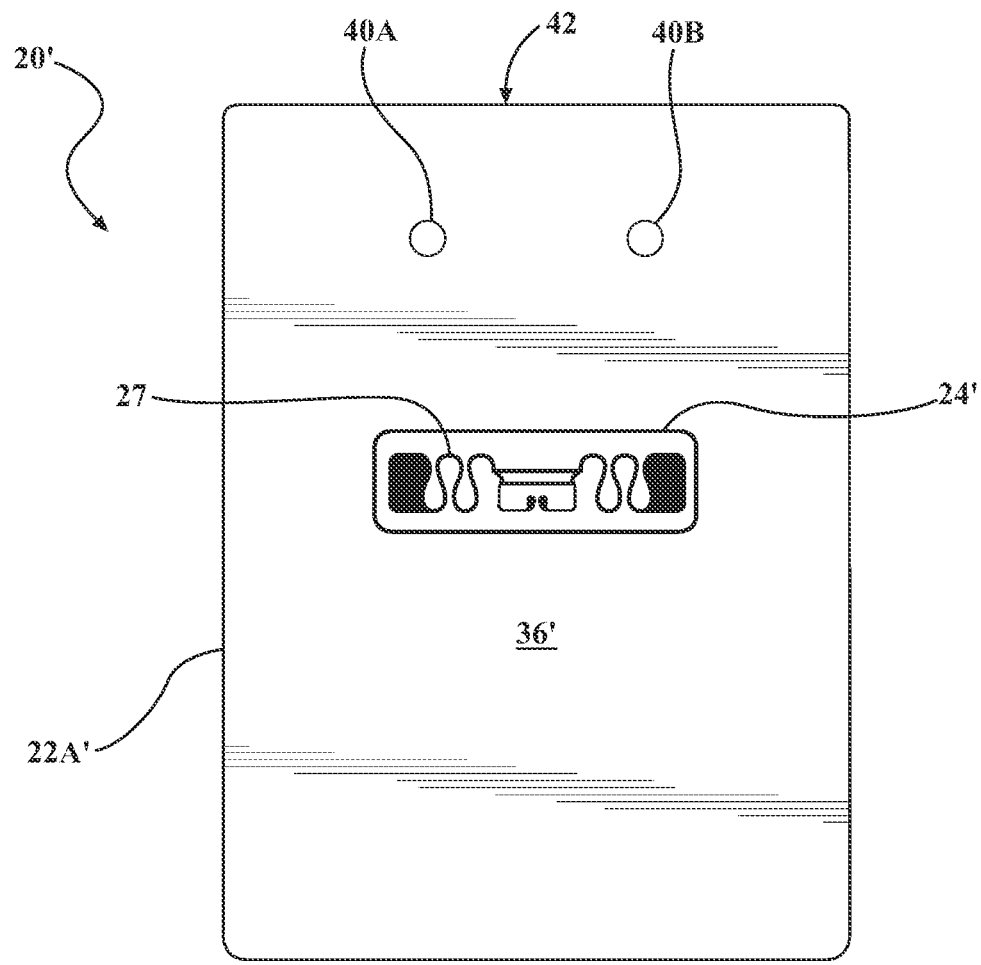
FIG. 4 is a rear view of a second embodiment of a high temperature radio frequency identification tag component.
Figure 5:
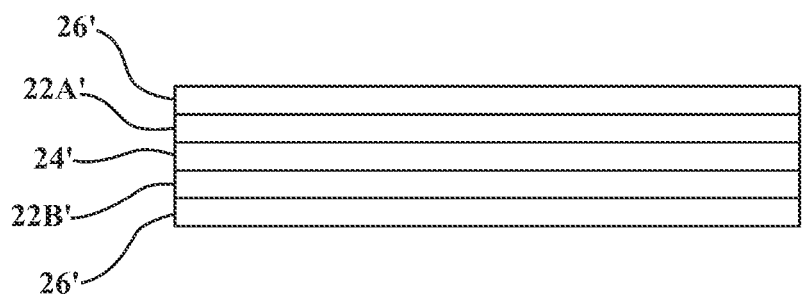
FIG. 5 is a schematic cross-section view of the radio frequency identification tag component of FIG. 4.

In another embodiment, illustrated in FIG. 4, the high temperature RFID tag component, shown generally at 20', includes an RFID element 24' that is embedded between two pieces of the polyimide material 22A', 22B'. In this embodiment, the RFID element 24' may not be attached by an adhesive. Rather, the RFID tag 24' may become embedded between two pieces of polyimide material 22A', 22B' that are adhered together. Further, at least one exposed surface 36' of the polyimide material 22A', 22B' is coated with a printable coating 26'. In FIG. 4, both exposed surfaces 36' of each piece of polyimide material 22A', 22B' are coated with a printable coating 26'. The two pieces of polyimide material 22A', 22B', the embedded RFID element 24', and optional printable coating 26' together are referred to as the identification (ID) tag 28'.

In both embodiments, the RFID tag 24, 24' is positioned generally centered on the polyimide base member 22, 22'. However, other arrangement and embodiments are contemplated, and the placement of the RFID tag on the polyimide base is not limited to the generally centered arrangement shown here.

As mentioned above, the printable coating 26, 26' allows for information to be printed on the high temperature RFID tag component 20, 20' with the use of standard, known printing methods and machines. It should be appreciated that the addition of the printable coating 26' on both sides of the identification tag 28' facilitates printing identifying information on both sides of the identification tag 28'.

Referring to FIG. 3, the high temperature RFID tag component 20, 20' further includes an attachment component 30. The attachment component 30 is used to attach the identification tag 28, 28' to its associated inventory item 32. Referring to FIGS. 1 and 4, the identification tag 28, 28' defines two apertures 40A, 40B that receive the attachment component 30 for coupling the identification tag 28, 28' to the inventory item 32. The two apertures 40A, 40B may be spaced apart by approximately 1.5 inches and spaced approximately 0.5 inches from the second edge 42 of the identification tag 28, 28'. Each aperture 40A, 40B may have a diameter of approximately 0.25 inches. In the exemplary embodiment shown here, the attachment component 30 may be a metal wire. The two apertures 40A, 40B are configured to receive a first end 30A of the metal wire 30. The metal wire 30 is then twisted to secure the identification tag 28 to the metal wire 30. The opposite end 30B of the metal wire 30 is secured to its associated inventory item 32. The opposite end 30B of the metal wire 30 may also be twisted to be secured to the inventory item 32. The specific dimensions regarding this embodiment of the attachment component are not limiting. Therefore, it is within the scope of this invention for the attachment component 30 to include other materials, shapes, dimensions, orientations, and attachment features. For example, the attachment component 30 may be implemented as a high temperature cable tie (i.e., zip tie) formed from a stainless steel material, or from a polyimide material. Further, the number of apertures is not limiting, and it is within the scope of this invention for there to be only one aperture or more than two apertures.

Figure 6:
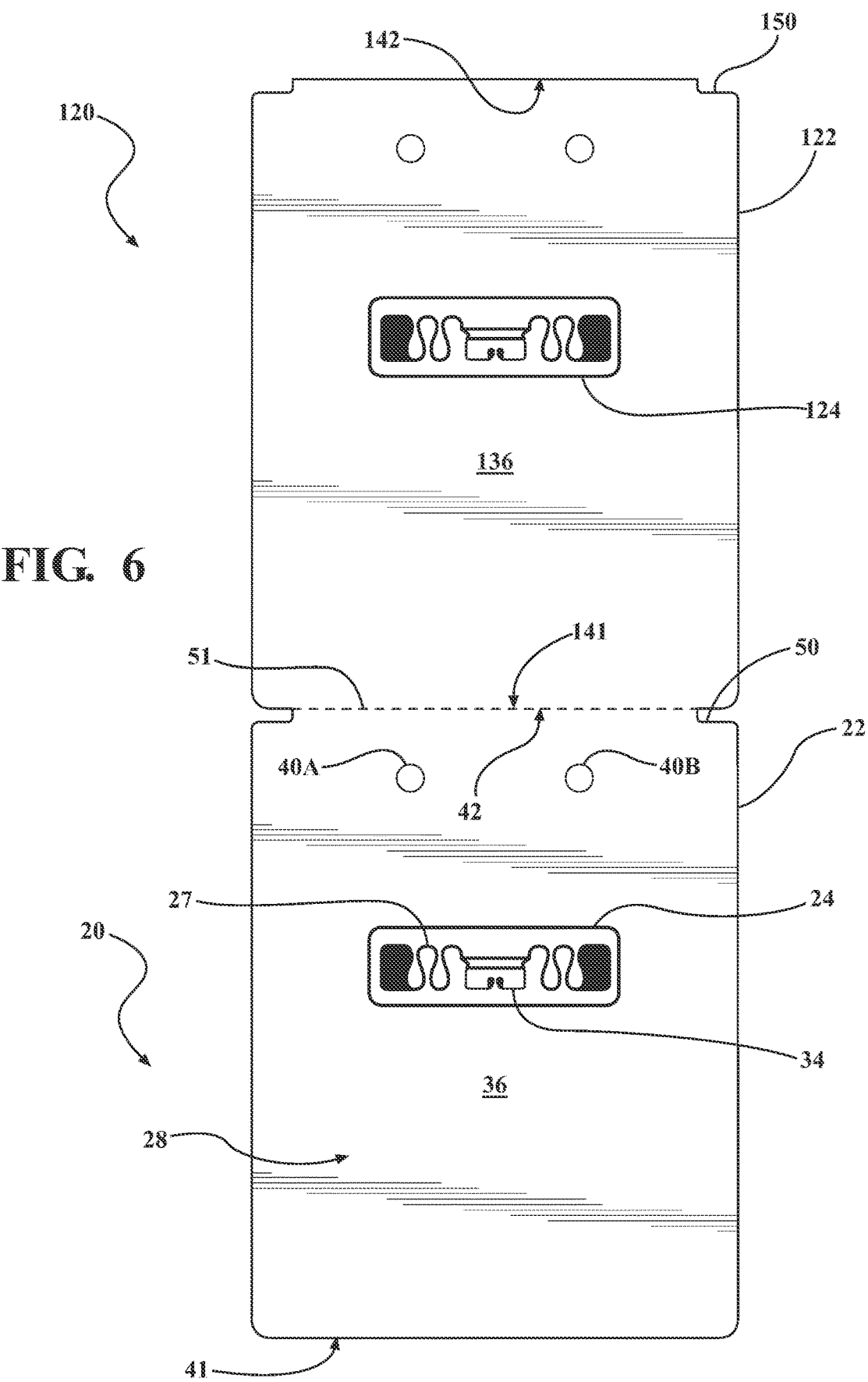
FIG. 6 is a rear view of two radio frequency identification tag components shown coupled to one another along one edge.

In some implementations of the high temperature RFID tag component 20, 20', more than one high temperature RFID tag component 20, 20' may be provided from a dispensing system and usable separately from each other. Referring again to FIG. 6, the first RFID tag component 20 may be coupled to a second RFID tag component 120. As will be appreciated from the subsequent description below, the second RFID tag component 120 is similar to the first RFID tag component 20 described above in connection with FIGS. 1 and 2. As such, the components and structural features of the second RFID tag component 120 that are the same as, or that otherwise correspond to, the first RFID tag component 20 are provided with the same reference numerals increased by 100 (e.g., 20 and 120). It should be further appreciated that this description and arrangement of the first and second RFID tag components 20, 120 could be implemented with the second embodiment of the RFID tag component 20'.

As such, each of the first RFID tag component 20 and the second RFID tag component 120 may include a base member 22, 122. More specifically, the first RFID tag component 20 includes a first base member 22 extending between the first edge 41 and the second edge 42, and the second RFID tag component 120 includes a second base member 122 extending between the first edge 141 and the second edge 142. A notch 50, 150 is defined in each of the first base member 22 and the second base member 122 adjacent to the respective second edge 42, 142. More specifically, the first base member 22 defines a first notch 50 adjacent to the second edge 42 and the second base member 122 defines a second notch 150 adjacent to the second edge 142. Here, each of the notches 50, 150 may be further defined as a pair of notches, with each notch of the pair of notches arranged on an opposing lateral side of the corresponding base member 22, 122.

In order to facilitate separating the first RFID tag component 20 from the second RFID tag component 120, the second edge 42 of the first base member 22 and the first edge 141 of the second base member 122 are defined by perforations 52. The perforations 52 facilitate tearing or ripping the base member 22 to separate the first RFID tag component 20 from the second RFID tag component 120. In this way, when the second edge 42 of the first base member 22 is separated from the first edge 141 of the second base member 122, the second edge 42 of the first base member 22 is a perforated edge.

In one example, the inventory item may be a bundle of steel bars 32. After a coil, roll, rod, tube, plate, or bar of steel 32 is newly formed and comes out of the furnace, it is at an elevated temperature, which may be as high as approximately 900° F. FIG. 3 shows several steel bars that have been bundled together by a strap or band 44 while still at an elevated temperature. A high temperature RFID tag component 20 is utilized to identify the bundle of steel bars 32. Identification information 46 may be printed on the printable coating 26 that covers the polyimide base member 22 to enable visible identification of the bundle of steel bars 32. The identification information 46 may include information such as a batch number, a part number, a material specification, and dimensions of the steel bars that are bundled together. This information may additionally be stored on the RFID element 24 (FIG. 1) or stored in a database and correlated with a unique identifier of the RFID element 24. The first end 30A of the attachment component 30, which is shown here as a metal wire, is looped through the two apertures 40A, 40B and twisted to affix the identification tag 28 to the attachment component 30. The second end 30B of the attachment component 30 is looped around the band 44 and twisted to affix the attachment component 30, and therefore the identification tag 20, to the bundle of steel bars 32. Here, the attachment component 30 is approximately 12 inches long, such that when the first end 30A and the second end 30B have been twisted as described above, there is a distance within the range of approximately 3-6 inches between the inventory item 32 and the identification tag 28.

Furthermore, the high temperature RFID tag component 20 may also be attached to a container (not shown) that contains hot forged metal parts. The containers may be made from, including but limited to, metal (such as steel). The hot forged parts heat up the container in which they are held. Therefore, the containers require a tag that can withstand high heat. This type of container is an example of an "asset" that can be tagged and the metal parts within the container are examples of "inventory items". The high temperature RFID tag component 20 can include information to identify the container, the inventory within the container, or both.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A high temperature radio frequency identification tag component for identifying an inventory item disposed at an elevated temperature that exceeds thermal resistance of the radio frequency identification tag, comprising:
    a base member made from a polyimide material;
    a radio frequency identification element being adhered to the base member;
    the base member being disposed between the inventory item and the radio frequency identification element thereby protecting the radio frequency identification element from the inventory item when the inventory item is disposed at an elevated temperature that exceeds a thermal resistance of the radio frequency identification element; and
    an attachment component interconnecting the radio frequency identification element to the inventory item while maintaining spacing between the radio frequency identification element and the inventory item.

2. The high temperature radio frequency identification tag component of claim 1, wherein the radio frequency identification element is attached to a surface of the polyimide base member.

3. The high temperature radio frequency identification tag component of claim 2, wherein the radio frequency identification element is attached to the surface of the polyimide base member with an adhesive.

4. The high temperature radio frequency identification tag component of claim 1, wherein:
    the base member comprises two layers of polyimide material; and
    the radio frequency identification element is disposed between the two layers of polyimide material.

5. The high temperature radio frequency identification tag component of claim 1, wherein the base member further includes a printable coating configured to receive identifying markings from a printing device.

6. The high temperature radio frequency identification tag component of claim 5, wherein the base member includes two surfaces, and wherein the printable coating is disposed on each of the two surfaces.

7. The high temperature radio frequency identification tag component of claim 1, wherein the base member defines an aperture extending therethrough for coupling the base member to an inventory item.

8. The high temperature radio frequency identification tag component of claim 1, wherein the attachment component is a metal wire.

9. The high temperature radio frequency identification tag component of claim 1, wherein the base member extends between a first edge and a second edge, and wherein a notch is defined in the base member adjacent to the second edge.

10. The high temperature radio frequency identification tag component of claim 9, wherein the second edge of the base member is a perforated edge.

11. The high temperature radio frequency identification tag component of claim 1, wherein a shape of the base member includes an area, and a shape of the RFID element includes an area, and wherein a ratio of the area of the base member to the area of the RFID element is greater than 10:1.

* * * * *